(No Model.)
M. B. TATE.
COOKING UTENSIL.
No. 325,188. Patented Aug. 25, 1885.
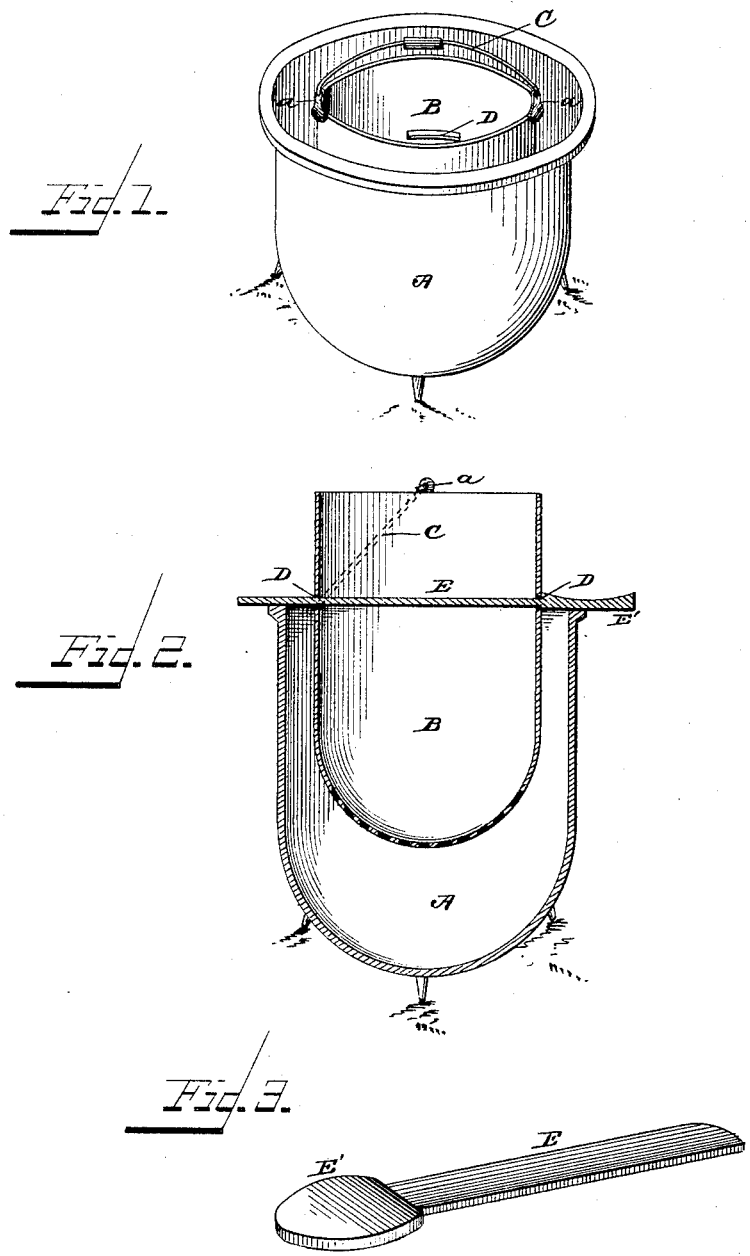
WITNESSES
C. W. Dashiell
Edward G. Diggers
INVENTOR
Minnie B. Tate.
By her Attorneys
C. A. Snow & Co.

United States Patent Office.

MINNIE BISHOP TATE, OF JOHNSTOWN, ILLINOIS.

COOKING UTENSIL.

SPECIFICATION forming part of Letters Patent No. 325,188, dated August 25, 1885.

Application filed March 16, 1885. (No model.)

*To all whom it may concern:*

Be it known that I, MINNIE BISHOP TATE, a citizen of the United States, residing at Johnstown, in the county of Cumberland and State of Illinois, have invented a new and useful Improvement in Cooking Utensils, of which the following is a specification, reference being had to the accompanying drawings.

This invention relates to cooking utensils; and it has for its object to provide a simple, inexpensive, and convenient attachment for the ordinary iron pot, by means of which the objectionable feature of lifting the pot to pour out the water from the same, or the slow, tedious task of withdrawing the vegetables by a spoon, will be entirely obviated.

With these and other objects in view, the said invention consists in certain details of construction and combination of parts, as hereinafter set forth, and particularly pointed out in the claims.

In the accompanying drawings, Figure 1 is a perspective view of my improvement applied to an ordinary iron pot when cooking vegetables or the like. Fig. 2 is a vertical longitudinal section of the same, showing the attachment supported within the pot above the water by an appliance specially designed for that purpose. Fig. 3 is a perspective view of the appliance for supporting the inner vessel when draining the water from the vegetables.

Like letters are used to indicate corresponding parts in the several figures of the drawings.

Referring to the drawings, A designates an ordinary iron pot of the usual construction, such as is employed in boiling beans, turnips, potatoes, greens, and the like. Within this pot I place my attachment or improvement, which consists of a cylindrical vessel, B, preferably made from tin, and having its bottom rounded and provided with a series of perforations or holes, the size of which may be changed to suit the circumstances. For instance, when boiling beans, peas, the holes should be sufficiently fine as to prevent the articles from escaping through the same, while when used to cook potatoes, turnips, greens, meats, doughnuts, and other articles of a more bulky nature the perforations should be made considerably larger. In practice, I have found that two sizes of holes are all that is necessary to provide, there being very little need of any intermediate sizes; but should the demands of trade call for such the requirements can easily be provided for. The sides of the vessel B at the top are provided with ears a for the attachment of the bail or handle C, which may be used in lifting the vessel out of the pot after the vegetables have had the water drained therefrom. Slots D D are provided through the sides of the vessel at the top for the passage of the appliance, (shown in Fig. 3,) which consists of a flat bar, E, having one end enlarged and shaped to serve as a handle, E'. It will be observed that when this appliance E, which I term a "support," is passed through the slots D, across the top of the vessel, the ends are sufficiently long to project out from the same on each side, so as to rest upon the upper edge of the outer pot, A, and in that manner be supported within the same. The enlarged end E' prevents the bar or support from working out of place at each end, while it also serves as a convenient handle in manipulating the vessel when dressing the vegetables ready for the table. As shown in Fig. 2, the bail or handle C for the vessel is thrown down to one side and the extended end of the support E passed over the bail C to hold the same down, and thus when handling the vessel B through the support E, by means of the handle E', the bail will not be in the way so as to interfere with the action of the parts.

The operation of my invention will be readily understood from the foregoing description taken in connection with the annexed drawings. The outer pot, A, when placed on the stove, is partly filled with water, and the vessel B placed within the pot and filled with the vegetables desired to be cooked. Sufficient water should be within the pot so as to cover the articles within the vessel B, when the latter rests upon the bottom of the pot, as during the action of boiling. When the vegetables have been cooked to a sufficient degree, the vessel B is raised within the pot and the supporter E is passed through the slots D of said vessel, the ends of the supporter resting upon the upper edge of the pot, and thereby allowing the water to drain from off the vegetables down into the said pot. In this position the parts may be retained for a sufficient length of time to admit of a thorough draining, and also to keep the articles contained within the vessel B hot and moist while waiting to be dressed for the table. In withdrawing the articles from the vessel B the latter is preferably raised out from the iron pot either by the handle E' on the support E, or by the bail or handle C, as may be found convenient and desirable. Since this vessel B is constructed from tin, it is considerably lighter than the usual iron pot, thereby making the drudgery of kitchen work less hard on the person attending to the same. Furthermore, the usual practice of withdrawing the vegetables by means of perforated ladles or spoons will be entirely dispensed with.

The vessel is specially designed for boiling beans and the like, where the water must be changed two or three times, since all that must be done is to raise the vessel with the articles contained therein above or out of the pot, the water draining off from the vegetables as before described, then emptying and refilling the pot, and replacing the vessel back in the same, this operation dispensing with the trouble and annoyance of draining the water off the vegetables when an iron pot only is employed.

By boiling the articles in tin they retain their color and flavor better than when cooked in the usual iron pot.

My invention is simple in construction, can be constructed to fit all sizes of pots, is convenient in its application, may be manufactured at a very low cost, and will prove of great utility for the purposes intended.

Having described my invention, I claim—

1. In a cooking utensil, the combination, with the outer pot or receptacle, of the inner vessel perforated as described, and receiving the articles to be cooked, slots provided in the sides of the vessel at the top, and a support introduced into the slots and extending out from the same to rest upon the top edge of the outer pot or receptacle, as and for the purpose set forth.

2. In a cooking utensil, the outer pot or receptacle, in combination with the inner vessel, B, perforated as described, a bail or handle for the same, and a support passed through slots or openings of the inner vessel, one of the extended ends of the support being shaped to provide a handle, for the purpose set forth.

In testimony that I claim the foregoing as my own, I have hereto affixed my signature in presence of two witnesses.

MINNIE BISHOP TATE.

Witnesses:
J. THOMASON,
EDWIN RODGERS.